United States Patent
Bin et al.

(10) Patent No.: US 10,948,088 B2
(45) Date of Patent: Mar. 16, 2021

(54) MECHANICAL FASTENING METHOD FOR VALVE PLUG WITH CARBIDE TIP

(71) Applicant: EMERSON PROCESS MANAGEMENT (TIANJIN) VALVES CO., LTD., Tianjin (CN)

(72) Inventors: Wang Bin, TianJin (CN); Timothy R. Parrie, Mingo, IA (US); Michel K. Lovell, Marshalltown, IA (US); RongXian Qi, TianJin (CN)

(73) Assignee: EMERSON PROCESS MANAGEMENT (TIANJIN) VALVES CO., LTD., Tianjin (CN)

( * ) Notice: Subject to any disclaimer, the term of this patent is extended or adjusted under 35 U.S.C. 154(b) by 0 days.

(21) Appl. No.: 16/119,177

(22) Filed: Aug. 31, 2018

(65) Prior Publication Data
US 2019/0063616 A1   Feb. 28, 2019

Related U.S. Application Data

(60) Provisional application No. 62/552,904, filed on Aug. 31, 2017.

(51) Int. Cl.
| *F16K 1/38* | (2006.01) |
| *F16K 1/36* | (2006.01) |
| *F16K 1/10* | (2006.01) |
| *B23P 15/00* | (2006.01) |
| *F16K 51/00* | (2006.01) |

(Continued)

(52) U.S. Cl.
CPC ............ *F16K 1/385* (2013.01); *B23P 15/001* (2013.01); *F16K 1/10* (2013.01); *F16K 1/36* (2013.01); *F16K 1/42* (2013.01); *F16K 1/487* (2013.01); *F16K 51/00* (2013.01)

(58) Field of Classification Search
CPC ... F16K 1/385; F16K 1/10; F16K 1/36; F16K 1/42; F16K 1/487; F16K 51/00; F16K 1/34; B23P 15/001
USPC .................................................. 251/357, 318
See application file for complete search history.

(56) References Cited

U.S. PATENT DOCUMENTS

| 2,277,251 A | 3/1942 | Palmer |
| 2,981,282 A * | 4/1961 | Mack ...................... F16K 15/00 137/516.29 |
| 5,388,613 A | 2/1995 | Kruger |

(Continued)

OTHER PUBLICATIONS

International Search Report for PCT/US2018/049056, dated Nov. 30, 2018.
Written Opinion for PCT/US2018/049056, dated Nov. 30, 2018.

*Primary Examiner* — Kelsey E Cary
(74) *Attorney, Agent, or Firm* — Marshall, Gerstein & Borun LLP

(57) ABSTRACT

A valve plug assembly includes a plug base, a first end of the base arranged for attachment to a valve stem, a second end of the plug base including a bore having a first portion and a second portion. The second portion of the bore is a conical terminus forming a first seat. A spacer has a through bore, a first end, and a second end, and is sized for insertion in the bore of the plug base and has a conical shape to engage the first seat, and the spacer also forms a second seat. A plug tip has a through bore and a conical end engaging the second seat and is arranged to engage the valve seat, and a cap screw extends through the plug tip and the spacer to mechanically secure the plug tip to the plug base.

19 Claims, 3 Drawing Sheets

(51) Int. Cl.
*F16K 1/42* (2006.01)
*F16K 1/48* (2006.01)

(56) References Cited

U.S. PATENT DOCUMENTS

| | | | |
|---|---|---|---|
| 5,878,993 A | 3/1999 | St. Germain | |
| 2004/0104374 A1* | 6/2004 | Lovell | F16K 1/48 251/357 |
| 2012/0286183 A1* | 11/2012 | McCarty | F16K 1/48 251/357 |
| 2015/0368766 A1* | 12/2015 | Smith | C22C 33/0285 251/359 |
| 2016/0223088 A1* | 8/2016 | Richardson | F16K 1/32 |
| 2016/0238154 A1 | 8/2016 | Alman | |

\* cited by examiner

MECHANICAL FASTENING METHOD FOR VALVE PLUG WITH CARBIDE TIP

FIELD OF THE INVENTION

The present invention relates generally to control valves and, in particular, relates to a valve plug having a mechanically retained tip, such as a carbide tip.

BACKGROUND

In many control valve applications, and particularly in control valve applications involving severe service conditions, the internal components of the control valve may be subject to three phase flow with, for example, possible flashing, cavitation, and particles, all of which can potentially cause severe erosion and/or vibration. Consequently, such valves are often provided with valve plugs having a corrosion resistant plug tip, which may be a ceramic material such as carbide, tungsten carbide, or other suitable materials.

In construction of such valve components, the plug tip is typically attached to a plug base using a shrink fit procedure where the relevant components are heated, fitted, then cooled. Alternatively, the plug tip may be attached to the plug base using a brazing process. In either process, it is possible that stress risers may be formed at the juncture between the plug tip and the underlying base. Such stress risers can and sometimes do contribute to premature failure of the plug tip by contributing to the formation and/or propagation of cracks in the plug tip.

SUMMARY

In accordance with a first exemplary aspect, a valve plug assembly is disclosed for use in a control valve having a valve stem, a flow passage, and a valve seat disposed in the flow passage. The valve plug assembly includes a plug base defining a longitudinal axis and having a first end and a second end, with the first end of the plug base arranged for attachment to a valve stem of the control valve, and with the second end of the plug base including a bore extending along the longitudinal axis, the bore including a first portion extending into the plug base a first distance and a second portion extending into the plug base a second distance less than the first distance. The first portion of the bore has a first diameter and the second portion of the bore has a second diameter greater than the first diameter, and the second portion of the bore extends from the second end of the plug base to a conical terminus, with the conical terminus forming a first seat. A spacer includes a through bore, a first end, and a second end, with the spacer sized for insertion in the second portion of the bore of the plug base. The first end of the spacer has a conical shape arranged to engage the first seat, and the second end of the spacer has a conical terminus forming a second seat. A plug tip includes a through bore and a first end having a conical shape that is arranged to engage the second seat of the spacer, and also includes a second end shaped to engage the valve seat of the valve. A cap screw is sized for insertion through the plug tip and the through bore of the spacer, and is arranged for threaded engagement with the first portion of the bore of the plug base, such that the cap screw mechanically secures the plug tip to the plug base.

In accordance with a second exemplary aspect, a method of forming a valve plug assembly for use in a control valve having a valve stem, a flow passage, and a valve seat, comprises providing a plug base defining a longitudinal axis and having a first end and a second end, arranging the first end of the plug base for attachment to the valve stem of the control valve, and providing the second end of the plug base with a bore extending along the longitudinal axis, the bore including a first portion extending into the plug base a first distance and a second portion extending into the plug base a second distance less than the first distance. The method includes providing the first portion of the bore with a first diameter and the second portion of the bore with a second diameter greater than the first diameter, providing the second portion of the bore extending from the second end of the plug base with a first shaped seat, and providing a spacer having a through bore, a first end, and a second end, the spacer sized for insertion in the second portion of the bore of the plug base, and the first end of the spacer having a shaped portion to cooperate with the first shaped seat, and providing the second end of the spacer with a second shaped seat. The method further includes providing a plug tip having a through bore, a first end having a conical shape arranged to engage the second shaped seat, and a second end shaped to engage the valve seat of the valve, and providing a cap screw sized for insertion through the plug tip and the through bore of the spacer, and arranging the cap screw for threaded engagement with the first portion of the bore of the plug base, the cap screw thereby mechanically securing the plug tip to the plug base.

In accordance with a third exemplary aspect, a valve plug assembly for use in a control valve having a valve stem, a flow passage, and a valve seat disposed in the flow passage, comprises a plug base defining a longitudinal axis and having a first end and a second end, the first end of the plug base arranged for attachment to the valve stem of the control valve, the second end of the plug base having a bore extending along the longitudinal axis, the bore including a first portion extending into the plug base a first distance and a second portion extending into the plug base a second distance less than the first distance, an inner end of the second portion of the bore terminating in a first shaped seat, and a spacer having a through bore, a first end, and a second end, the spacer sized for insertion in the second portion of the bore of the plug base, the first end of the spacer having a shaped end to cooperate with the first shaped seat, the second end of the spacer having a second shaped seat. A plug tip has a through bore, a first end, and a second end, the first end being shaped and arranged to engage the second shaped seat, and the second end shaped to engage the valve seat of the valve. A cap screw is sized for insertion through the plug tip and the through bore of the spacer, the cap screw arranged for engagement with the first portion of the bore of the plug base, the cap screw securing the plug tip to the plug base.

In further accordance with the foregoing first and/or second aspects, a valve plug assembly and/or method may further include any one or more of the following preferred forms.

In accordance with one preferred form, the plug base includes a side bore sized to receive an insert pin, wherein the insert pin engages an internal portion of the cap screw.

In accordance with another preferred form, the plug tip may comprise carbide or carbide, tungsten carbide, or a ceramic material.

In accordance with another preferred form, the plug tip may include a counterbore and the cap screw may include a screw head sized to be seated within the counterbore.

In accordance with another preferred form, the conical shape of the spacer and the first seat cooperate to center the spacer relative to the longitudinal axis, and the conical shape of the plug tip and the second seat cooperate to center the plug tip relative to the longitudinal axis.

In accordance with another preferred form, the seats and the plug tip may be suitably shaped, such that the shaped portion of the spacer and the first seat cooperate to center the spacer relative to the longitudinal axis, and the shaped portion of the plug tip and the second seat cooperate to center the plug tip relative to the longitudinal axis.

In accordance with another preferred form, the shaped end of the spacer and the first seat cooperate to center the spacer relative to the longitudinal axis, and the shaped first end of the plug tip and the second shaped seat cooperate to center the plug tip relative to the longitudinal axis.

DETAILED DESCRIPTION

Although the following text sets forth a detailed description of one or more exemplary embodiments of the invention, it should be understood that the legal scope of the invention is defined by the words of the claims set forth at the end of this patent. Accordingly, the following detailed description is to be construed as exemplary only and does not describe every possible embodiment of the invention, as describing every possible embodiment would be impractical, if not impossible. Numerous alternative embodiments could be implemented, using either current technology or technology developed after the filing date of this patent. It is envisioned that such alternative embodiments would still fall within the scope of the claims defining the invention.

Figure 1:
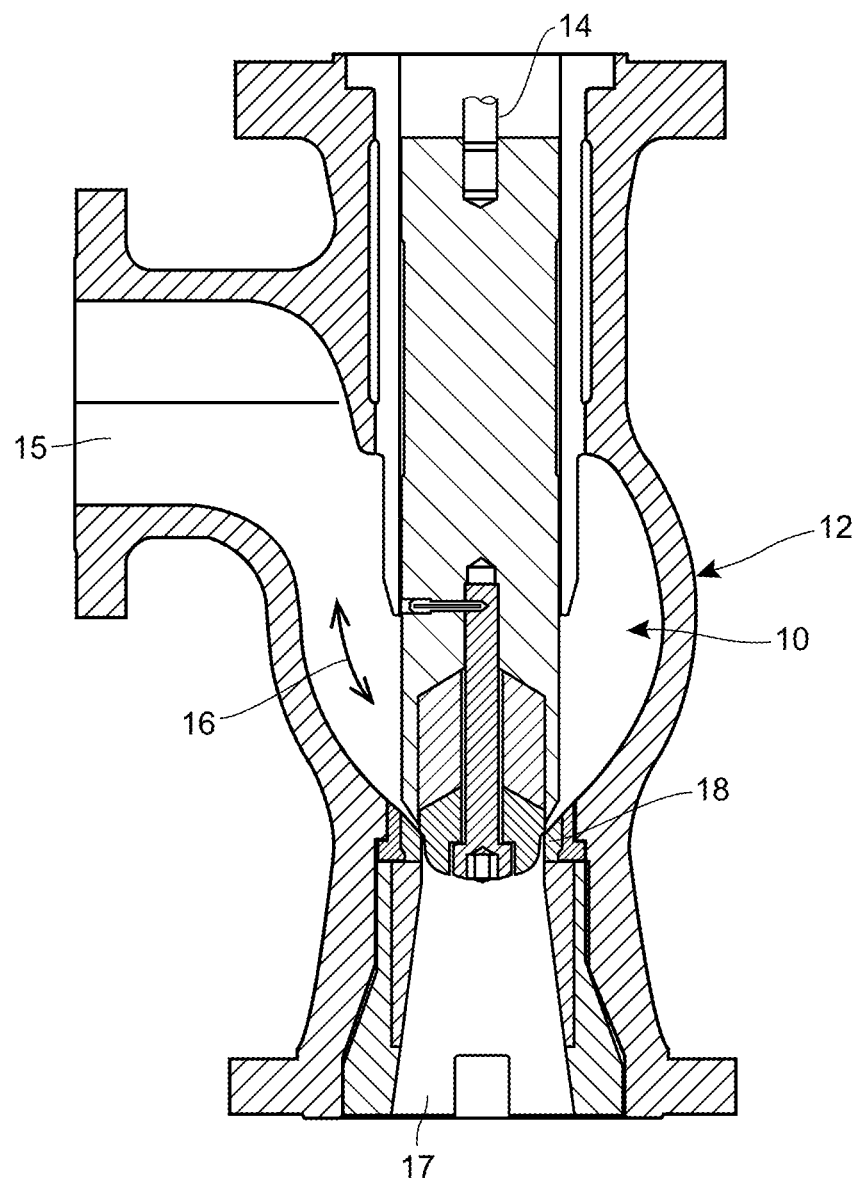
FIG. 1 is a cross-sectional view of a control valve having a plug assembly assembled in accordance with the teachings of a first disclosed example of the present invention.
Figure 2:
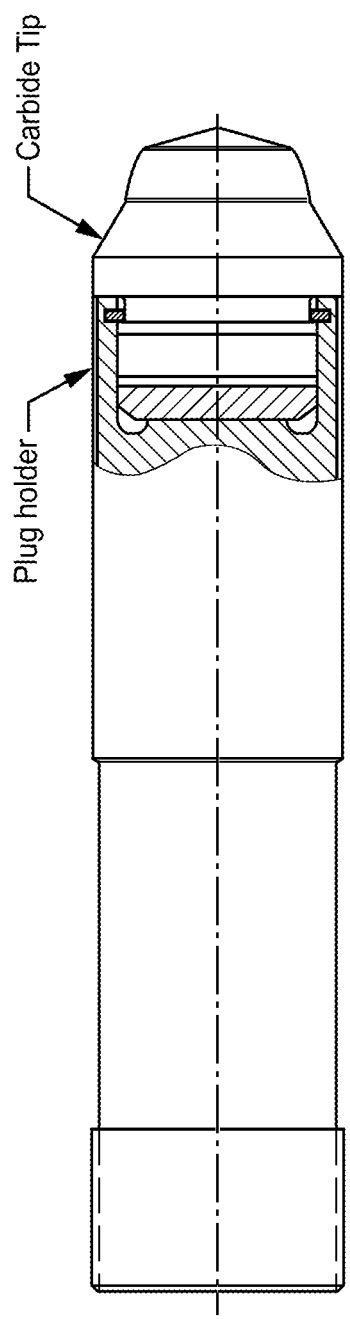
FIG. 2 is an enlarged view, partly in cross-section, of a conventional carbide-tipped plug showing details of a conventional shrink fit design.

Referring now to the drawings, FIG. 1 shows a valve plug assembly 10 assembled in accordance with the teachings of an exemplary embodiment of the present invention for use in the control valve 12 having a valve stem 14, a flow passage 16, and a valve seat 18. Those of skill in the art will readily understand that the control valve 12 includes an inlet 15 and an outlet 17 connected by the flow passage 16. The valve plug assembly 10 is coupled to the valve stem 14 and moved by any suitable actuator (not shown) between an open position in which the valve plug assembly 10 is spaced away from the valve seat 18, thereby permitting flow through the control valve 12, and a closed position in which the valve plug assembly 10 is seated against the valve seat 18, thereby prohibiting flow through the control valve 12.

Figure 3:
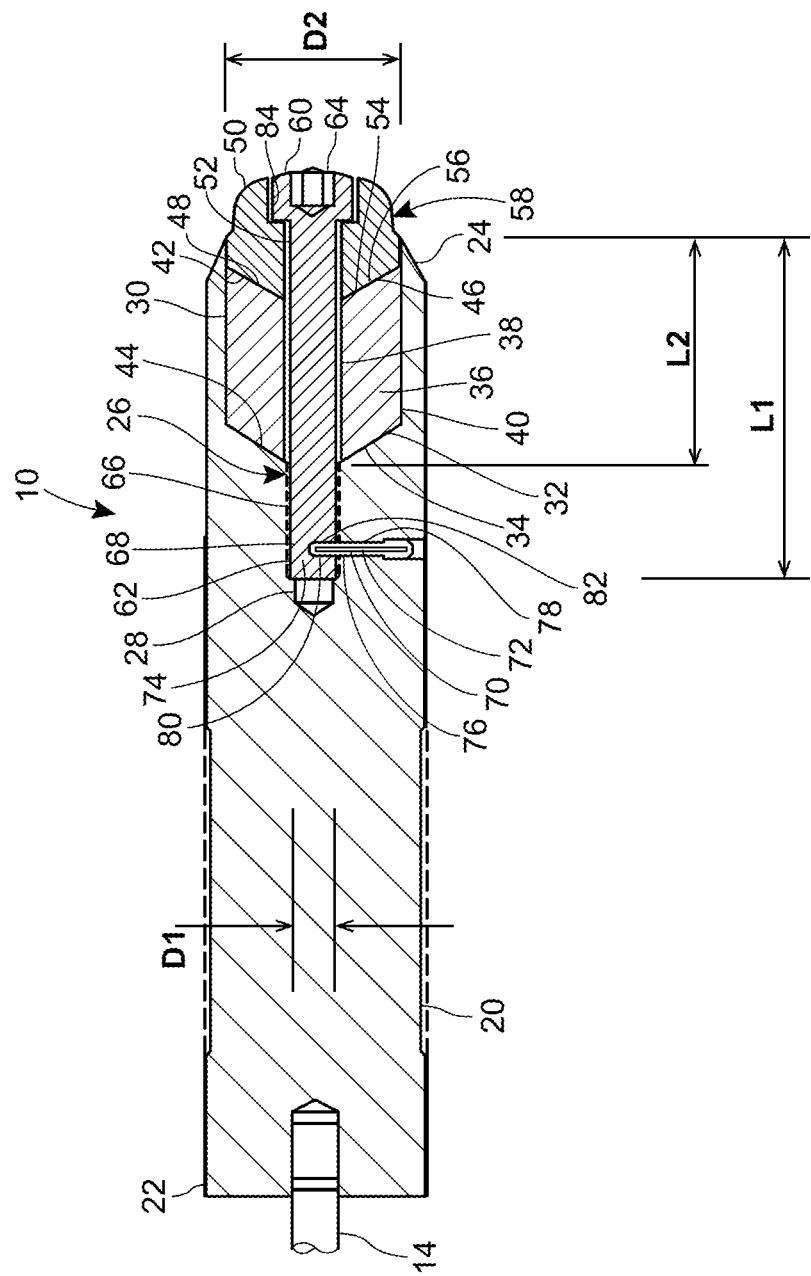
FIG. 3 is an enlarged cross-sectional view of a carbide tipped valve plug assembled in accordance with the teachings of one exemplary aspect of the present invention.

Referring to FIG. 3, the plug assembly 10 includes a plug base 20 defining a longitudinal axis X and having a first end 22 and a second end 24. The first end 22 of the plug base 20 is arranged for attachment to the valve stem 14 of the control valve 12. The second end 24 of the plug base 20 includes a bore 26 extending along the longitudinal axis L, with the bore 26 including a first portion 28 extending into the plug base 20 a first distance L1 and a second portion 30 extending into the plug base 20 a second distance L2, with the second distance L2 being less than the first distance L1. The first portion 28 of the bore 26 has a first diameter D1 and the second portion 30 of the bore 26 has a second diameter D2, with the second diameter D2 being greater than the first diameter D1. The second portion 30 of the bore 26 extends from the second end 24 of the plug base 20 to an end or terminus 32. In the disclosed example the terminus 32 is a conical terminus and forms a first seat 34.

A spacer 36 has a through bore 38 and also includes a first end 40 and a second end 42. The spacer 36 is sized for insertion into the second portion 30 of the bore 26 of the plug base 20, and in the disclosed example the first end 40 of the spacer 36 includes a conical portion 44. The conical portion 44 is arranged to engage the first seat 34 at the terminus 32 of the second portion 30 of the bore 26 of the plug base. The second end 42 of the spacer 36 has a conical terminus 46 forming a second seat 48. A plug tip 50 includes a through bore 52, and a first end 54 having a conical portion 56 is arranged to engage the second seat 48 of the spacer 36. The plug tip 50 also includes a second end 58 shaped to engage the valve seat 18 of the control valve 12.

A cap screw 60 includes ends 62 and 64 and is sized for insertion through the bore 52 of the plug tip 50, as well as through the through bore 38 of the spacer 36. The end 64 of the cap screw 60 is shaped to engage the plug tip 50, while the end 62 includes threads 66 to allow threaded engagement with cooperating threads 68 in the first portion 28 of the bore 26 of the plug base 20. Accordingly, the cap screw 60 mechanically secures the plug tip 50 to the plug base 20.

The plug base 20 may include a side bore 70 as shown in FIG. 3. The side bore 70 sized to receive an insert pin 72, which is sized for insertion into the side bore 70 to a position in which the insert pin 72 engages an inner portion 74 of the cap screw 60. The inner portion 74 of the cap screw 60 is disposed within the first portion 28 of the bore 26. The insert pin 72 may include a threaded portion 76 arranged to engage cooperating threads 78 on the side bore, thereby allowing an end 80 of the insert pin 72 to engage the inner portion 74 of the cap screw 60 via an interference fit. Alternatively, the inner portion 74 of the cap screw 60 may have a side bore 82, such that the end 80 of the insert pin 72 engages the side bore 82 of the cap screw. As another alternative, the end 80 of the insert pin 72 and the side bore 82 of the cap screw 60 may have cooperating threads. In any one of the foregoing arrangements, the insert pin 72 secures the cap screw 60 against rotation, thereby serving to secure the plug tip 50 against the second seat 48 of the spacer 36, and in turn securing the first end 40 of the spacer 36 against the first seat 34. In accordance with an exemplary form, an outer extent of the insert pin 72 pin used for anti-rotation purposes may be countersunk into the plug body 20, and may be covered by a liner, and thus the insert pin 72 is protected from the surrounding components.

The plug tip 50 may be selected from a ceramic material, and may be carbide or tungsten carbide, or may be any other suitable material. The plug tip 50 may be provided with a counterbore 84, which is sized to receive a screw head 86 of the cap screw 60, such that all or a portion of the screw head 86 is recessed in the plug tip 50, and therefore wholly or at least partially out of the path of fluid flow.

The first seat 34 and the first end 40 of the spacer 36 may be suitably shaped to cooperate with one another in order to cooperate to center the spacer relative to the longitudinal axis L. Similarly, wherein the second seat 48 on the second end 42 of the spacer 36 may also be suitably shaped to cooperate with one another to center the plug tip relative to the longitudinal axis L. In the disclosed example, these shapes are primarily cone or truncated cone shapes. However, other shapes may prove suitable. For example, these cooperating shapes may be semi-spherical or other curved forms. In sum, the conical or other shapes facilitate or otherwise promote the self-centering of the spacer and the plug tip relative to the longitudinal axis L.

The cap screw 60 may be constructed from Inconel 718, which in testing has shown to exhibit favorable strength properties. Those of skill in the relevant art, upon reading the present disclosure and obtaining the benefits thereof, may arrive at other shapes for the spacer 36 and the plug tip 50 to promote self-centering and/or longevity. The spacer 36 may be constructed from austenitic stainless steel, which offers a larger thermal expansion factor, although other materials may prove suitable. Such material may serve to compensate for the thermal expansion difference between the carbide tip and cap screw in the mechanically secured components, and maintain proper clamping stress for the connection. When constructed of austenitic stainless steel or other suitably and relatively soft materials, the spacer 36 may serve to function as a cushion for the relatively hard ceramic or carbide plug tip 50, and can serve to absorb impact forces thus inhibiting crack formation in high vibration applications.

The plug tip 50 is hollow, and has a relatively even thickness, thus serving to avoid the creation of internal defects and stress during manufacturing, offering advantages over a solid plug tip.

When constructed, a valve plug assembly assembled in accordance with the exemplary teachings outlined herein may offer one or more technical advantages not achievable with prior art teachings. For example, valve plug assembly employs mechanical fastening structures and methods, which promotes ease of manufacturing and improve the quality of the resulting assembly. Further, the disclosed structures and methods promote a low- or lower-cost design, thus potentially offering commercial advantages. Further, the use of select materials outlined herein free manufacturers from stringent requirements of shrink fit or brazing construction by allowing the use of lower cost, readily available, and standard materials.

Another potential technical advantage is the disclosed aspects facilitate easier maintenance by allowing the end user to retrofit a worn plug tip, instead of replacing the entire valve plug assembly.

When compared to prior art structure and assembly, one or more aspects of the present invention inhibit the development of harmful and hard-to-control internal stresses resulting from prior construction, such as may be found in the shrink fit process.

When compared to prior art structure and assembly, one or more aspects of the present invention result in an assembly that offers better performance and longevity over a wider temperature range, which offers advantages over the prior art brazing assembly structure and method. This may be especially true for larger valve trim sizes.

Compared to conventional mechanical fastening and clamping, one or more aspects of the present disclosure promote control of stresses on the plug tip and other components, again favoring better performance over a wider temperature range.

While certain representative embodiments and details have been shown for purposes of illustrating the invention, it will be apparent to those skilled in the art that various changes in the methods and apparatus disclosed herein may be made without departing from the scope of the invention.

The invention claimed is:

1. A valve plug assembly for use in a control valve having a valve stem, a flow passage, and a valve seat disposed in the flow passage, the valve plug assembly comprising:
   a plug base defining a longitudinal axis and having a first end and a second end;
   the first end of the plug base arranged for attachment to a valve stem of the control valve;
   the second end of the plug base including a bore extending along the longitudinal axis, the bore including a first portion extending into the plug base a first distance and a second portion extending into the plug base a second distance less than the first distance;
   the first portion of the bore having a first diameter and the second portion of the bore having a second diameter greater than the first diameter;
   the second portion of the bore extending from the second end of the plug base to a conical terminus, the conical terminus forming a first seat;
   a spacer having a through bore, a first end, and a second end, the spacer sized for insertion in the second portion of the bore of the plug base, the first end of the spacer having a conical shape arranged to engage the first seat, the second end of the spacer having a conical terminus forming a second seat;
   a plug tip having a through bore, an inner first end having a conical shape arranged to engage the second seat of the spacer, and a second end shaped to engage the valve seat of the valve; and
   a cap screw sized for insertion through the plug tip and the through bore of the spacer and arranged for threaded engagement with the first portion of the bore of the plug base;
   wherein the cap screw mechanically secures the plug tip to the plug base.

2. The valve plug assembly of claim 1, wherein the plug base includes a side bore sized to receive an insert pin, and wherein the insert pin engages an internal portion of the cap screw.

3. The valve plug assembly of claim 1, wherein the plug tip is selected from a ceramic material.

4. The valve plug assembly of claim 1, wherein the plug tip comprises carbide or tungsten carbide.

5. The valve plug assembly of claim 2, wherein the plug tip includes a counterbore and the cap screw includes a screw head sized to be seated within the counterbore.

6. The valve plug assembly of claim 1, wherein the wherein the conical shape of the spacer and the first seat cooperate to center the spacer relative to the longitudinal axis, and wherein the conical shape of the plug tip and the second seat cooperate to center the plug tip relative to the longitudinal axis.

7. A method of forming a valve plug assembly for use in a control valve, the control valve having a rigid valve stem, a flow passage, and a valve seat disposed in the flow passage, the method comprising:
   providing a plug base defining a longitudinal axis and having a first end and a second end;
   arranging the first end of the plug base for attachment to the valve stem of the control valve such that the plug base moves in conjunction with the valve stem;
   providing the second end of the plug base with a bore extending along the longitudinal axis, the bore including a first portion extending into the plug base a first distance and a second portion extending into the plug base a second distance less than the first distance;
   providing the first portion of the bore with a first diameter and the second portion of the bore with a second diameter greater than the first diameter;
   providing the second portion of the bore extending from the second end of the plug base with a first shaped seat;

providing a spacer having a through bore, a first end, and a second end, the spacer sized for insertion in the second portion of the bore of the plug base, and the first end of the spacer having a shaped portion to cooperate with the first shaped seat, and providing the second end of the spacer with a second shaped seat;

providing a plug tip having a through bore, an inner portion defining a first end having a conical shape arranged to engage the second shaped seat, and a second end shaped to engage the valve seat of the valve;

providing a cap screw sized for insertion through the plug tip and the through bore of the spacer, and arranging the cap screw for threaded engagement with the first portion of the bore of the plug base, the cap screw thereby mechanically securing the plug tip to the plug base.

8. The method of claim 7, including providing the plug base with a side bore sized to receive an insert pin, and inserting the insert pin in the side bore to engage the cap screw, thereby locking the cap screw against rotation.

9. The method of claim 7, including selecting the plug tip is from a ceramic material.

10. The method of claim 7, including forming the plug tip from carbide or tungsten carbide.

11. The method of claim 7, including providing the plug tip with a counterbore and providing the cap screw with a screw head sized to be seated within the counterbore.

12. The method of claim 7, including arranging the shaped portion of the spacer and the first seat to cooperate to center the spacer relative to the longitudinal axis, and arranging the shaped portion of the plug tip and the second seat to cooperate to center the plug tip relative to the longitudinal axis.

13. A valve plug assembly for use in a control valve having a valve stem, a flow passage, and a valve seat disposed in the flow passage, the valve plug assembly comprising:

a plug base defining a longitudinal axis and having a first end and a second end;

the first end of the plug base arranged for direct attachment to the valve stem of the control valve;

the second end of the plug base having a bore extending along the longitudinal axis, the bore including a first portion extending into the plug base a first distance and a second portion extending into the plug base a second distance less than the first distance, an inner end of the second portion of the bore terminating in a first shaped seat;

a spacer having a through bore, a first end, and a second end, the spacer sized for insertion in the second portion of the bore of the plug base, the first end of the spacer having a shaped end to cooperate with the first shaped seat, the second end of the spacer having a second shaped seat;

a plug tip having a through bore, an inner first end, and a second end, the first end being shaped and arranged to engage the second shaped seat, and the second end shaped to engage the valve seat of the valve; and a cap screw sized for insertion through the plug tip and the through bore of the spacer, the cap screw arranged for engagement with the first portion of the bore of the plug base, the cap screw securing the plug tip to the plug base.

14. The valve plug assembly of claim 13, wherein the plug base has a side bore sized to receive an insert pin, the insert pin arranged in the side bore to interfere with the cap screw thereby locking the cap screw against rotation.

15. The valve plug assembly of claim 13, wherein plug tip comprises a ceramic, carbide, or tungsten carbide.

16. The valve plug assembly of claim 13, wherein the plug tip includes a counterbore and the cap screw includes a screw head sized to be seated within the counterbore.

17. The valve plug assembly of claim 13, wherein the shaped end of the spacer and the first seat cooperate to center the spacer relative to the longitudinal axis, and wherein the shaped first end of the plug tip and the second shaped seat cooperate to center the plug tip relative to the longitudinal axis.

18. The valve plug assembly of claim 13, and wherein the spacer includes a first coefficient of thermal expansion, the plug tip includes a second coefficient of thermal expansion, and the cap screw includes a third coefficient of thermal expansion, and wherein the first coefficient of thermal expansion is larger than the second and third coefficients of thermal expansion, and wherein the second and third coefficients of thermal expansion are dissimilar.

19. The valve plug assembly of claim 18, wherein the spacer is constructed of austenitic stainless steel and is softer than the plug tip, such that the spacer is arranged to absorb impact forces and/or thermal expansion forces from the plug tip.

* * * * *